(No Model.)
J. H. BASSLER.
METHOD OF WELDING BY ELECTRICITY.
No. 456,540. Patented July 21, 1891.
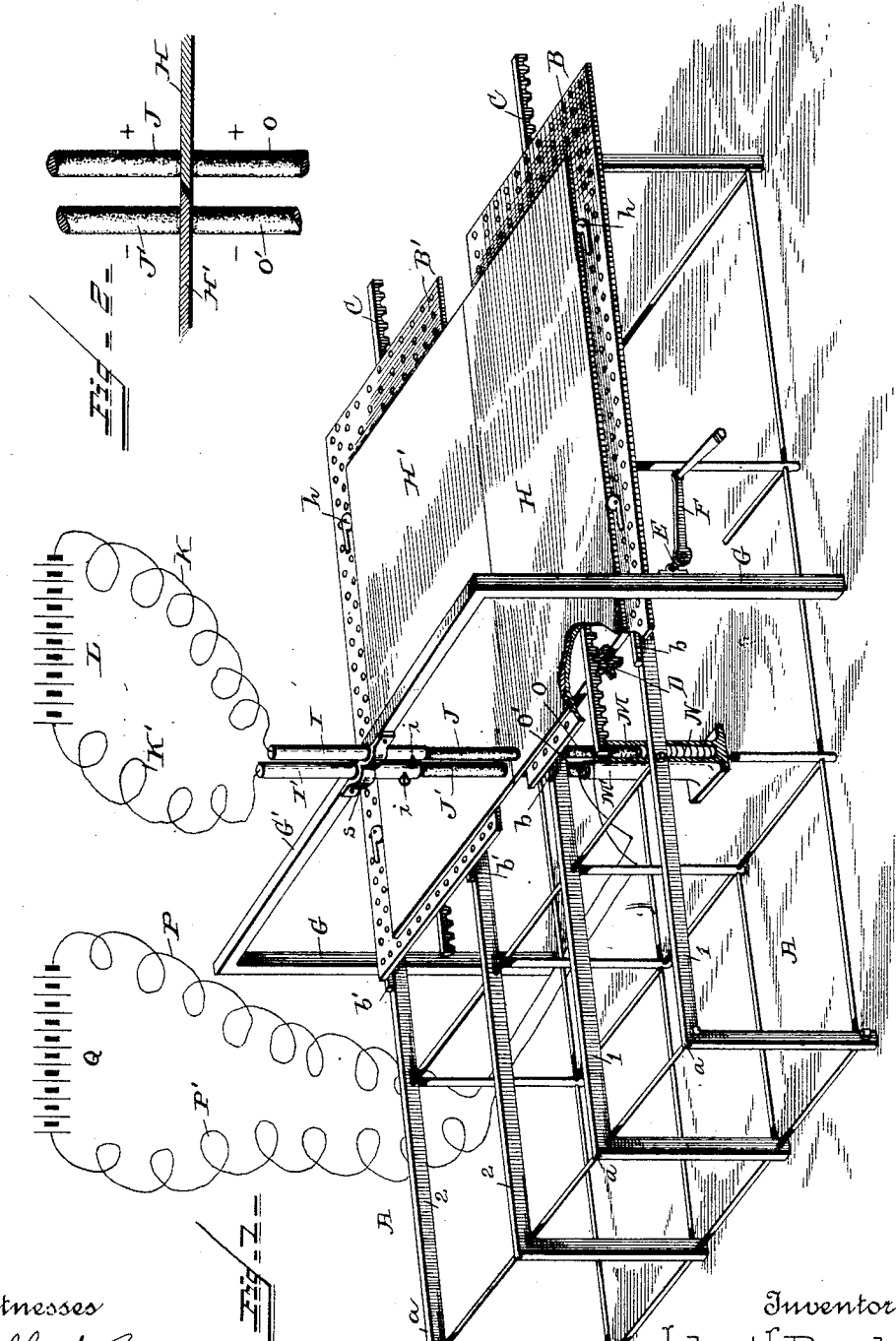
Witnesses
Albert Pfuidew
Robert Owens
Inventor
John H. Bassler.
By his Attorneys
Anderson & Myers

UNITED STATES PATENT OFFICE.

JOHN H. BASSLER, OF MYERSTOWN, PENNSYLVANIA.

METHOD OF WELDING BY ELECTRICITY.

SPECIFICATION forming part of Letters Patent No. 456,540, dated July 21, 1891.

Application filed August 16, 1888. Serial No. 282,919. (No model.)

*To all whom it may concern:*

Be it known that I, JOHN H. BASSLER, a citizen of the United States of America, residing at Myerstown, in the county of Lebanon and State of Pennsylvania, have invented certain new and useful Improvements in Methods of Welding Together Heavy Metal Plates by Means of Electricity, of which the following is a specification, reference being had therein to the accompanying drawings.

My invention contemplates an improved method of welding together heavy plates of metal—such, for instance, as boiler-plates—by means of electricity.

The invention consists in first coating the meeting edges of the plates to be operated upon with carbon, then placing those edges close together, then sending simultaneously one current of electricity transversely through the joint from the upper surface of the plates and another current transversely through the joint from the lower surface of the plates and moving the plates longitudinally with relation to the direction of said currents, in order that the line of joint may be subjected to the welding heat.

In carrying out my method I apply to the meeting edges of the metal plates a small quantity of finely-powdered carbon mixed with any suitable fluid that will cause it to adhere to the metal. By applying the carbon to the meeting edges of the plates the heat will be intensified at the joint, for as carbon is not so good a conductor of electricity as the metal itself, it follows that it will offer resistance to the electric currents. I establish the electric currents by placing one pair of electrodes in contact with the upper surface near the meeting edges of the plates to be welded, and another pair of electrodes in contact with the under surface near the meeting edges, the latter pair positioned substantially under the former, and both the positive electrodes being in contact with one plate, while both of the negative electrodes are in contact with the other plate, each pair of electrodes connected with any suitable source of electricity. By passing one current of electricity across the joint from the upper surface of the plates and simultaneously another current across the joint from the lower surface it is possible to bring metal plates of considerable thickness to a welding heat in a very short time.

My method is not dependent upon any mechanism other than such electrical appliances as will readily suggest themselves; but for the purpose of making public one convenient manner in which heavy plates may be easily manipulated I have illustrated an apparatus well adapted for carrying the plates forward so as to bring the line of joint in proper position to be welded.

Figure 1 of the drawings is a perspective view of the apparatus, and Fig. 2 is a broken detail view showing the positions of the electrodes with relation to each other and to the plates to be welded.

Referring to the drawings, A represents a rectangular frame-work, the four top rails 1 1 and 2 2 of which are grooved along the upper edge, as at $a$.

B B' are two perforated bed-plates having runners $b$ and $b'$ secured to their under sides, which runners are so positioned as to rest in the grooves in rails 1 and 2. Each bed-plate is also provided on its under side with a rigidly-attached longitudinal rack-bar C, with each of which gears a pinion D, (only one of which is seen,) mounted on a shaft E, extending across the frame-work underneath the bed-plates and provided at one end with a crank-handle F, the said shaft being journaled in brackets attached to two uprights G, said uprights being connected at top by a cross-bar G'.

H H' represent two metal plates to be welded, they being secured in position on the bed-plates B B' by means of cam-levers $h$, pivoted to the bed-plates.

I I' are the upper-carbon holders, consisting simply of metal tubes, in which the carbon electrodes J J' are secured by means of thumb-screws $i$. These carbon-holders are held in proper relation to each other by means of metal straps $s$, secured to the cross-bar G', but are free to slide therein and are properly insulated. As seen in both figures of the drawings the positive electrode rests upon one plate and the negative electrode upon the other. Wires K K' lead from these carbon-holders to a source of electrical supply L.

M M' represent the lower-carbon holders, one of which is shown in section. These are hollow down to the base, and each is provided inside with a light coil-spring N, upon which the electrodes O O' rest loosely, so that they may by spring-pressure be held up lightly against the under surface of the plates, their relation to the upper electrodes being clearly seen in Fig. 2. These holders are of course properly insulated at the base. Wires P P' lead from these carbon-holders to another source of electrical supply Q.

It may in some cases be preferable to bevel the edges of the plates, as seen in Fig. 2.

When the metal plates are firmly secured in position on the bed-plates with their meeting edges forced closely together, both currents are turned on, and as the plates become sufficiently heated in the vicinity of the electrodes they are moved forward slowly by turning crank F.

Having thus fully set forth my invention, what I claim as new, and desire to secure by Letters Patent, is—

The above-described method of welding together heavy plates of metal by means of electricity, which consists in first coating the meeting edges of the plates with carbon, then placing those edges close together, then sending simultaneously one current of electricity transversely through the joint from the upper surface of the plates and another current transversely through the joint from the lower surface of the plates, and moving the plates longitudinally with relation to the direction of said currents.

In testimony whereof I affix my signature in presence of two witnesses.

JOHN H. BASSLER.

Witnesses:
WM. HUNTER MYERS,
ALBERT SPEIDEN.